March 24, 1931.  L. W. MOULTON  1,797,834
CASTELLATING MACHINE
Filed Nov. 1, 1928   5 Sheets-Sheet 1

WITNESS
J. T. Mains

INVENTOR
L. W. Moulton
BY
Denison & Thompson
ATTORNEYS

March 24, 1931. L. W. MOULTON 1,797,834
CASTELLATING MACHINE
Filed Nov. 1, 1922 5 Sheets-Sheet 5

INVENTOR
L. W. Moulton

WITNESS
J. T. Mains

BY
Davison & Thompson
ATTORNEYS

Patented Mar. 24, 1931

1,797,834

UNITED STATES PATENT OFFICE

LLOYD W. MOULTON, OF SYRACUSE, NEW YORK

CASTELLATING MACHINE

Application filed November 1, 1928. Serial No. 316,528.

This invention relates to a machine for castellating nuts, bolt heads and other multi-sided articles in which slots are to be broached in each piece of work in different positions or in intersecting lines preferably at uniform angles about a common axis of each piece of work.

The main object is to effect a continuous successive feed of the individual pieces of work rectilinearly in one direction into successive engagement with a plurality of substantially straight broaching tools arranged in longitudinally spaced relation along the line of travel of the articles to be operated upon, and also to automatically effect a turning movement of the individual articles as they are successively presented to the space between the broaching tools without interrupting the longitudinal movement of said articles.

Another object is to effect this continuous and successive feeding of the individual articles along and against the broaching tools by means of an endless conveyor having recessed abutments arranged in uniformly spaced relation longitudinally with their recesses facing in the direction of movement for receiving and holding individual articles on the conveyor as they are fed along and against the broaching tools.

A further object is to provide means actuated by the forward movement of the individual articles for effecting the turning movement of said articles as they are successively presented to the space or spaces between the broaching dies.

Other objects and uses relating to specific parts of the machine will be brought out in the following description.

As illustrated this machine comprises a conveyor mechanism for successively feeding a multiplicity of the articles to be operated upon in one direction; means for successively depositing the articles upon the conveyor; a plurality of broaching devices arranged in sequence along the line of travel of the conveyor with their broaching tools in the path of movement of said articles for broaching the same as they are successively presented to the broaching devices; means for turning the individual articles in transit from one broaching device to another; and means for lubricating the moving parts and for clarifying the lubricant for reuse; together with suitable supporting means for the various mechanisms.

*Conveyor mechanism*

The conveyor mechanism comprises in this instance an endless chain belt 1 mounted upon a pair of longitudinally spaced sprocket drums 2 and 2' which are of substantially the same diameter and are adapted to revolve about parallel axes in about the same horizontal plane for supporting the upper side of the belt in a substantially horizontal plane.

Figures 1, 3:
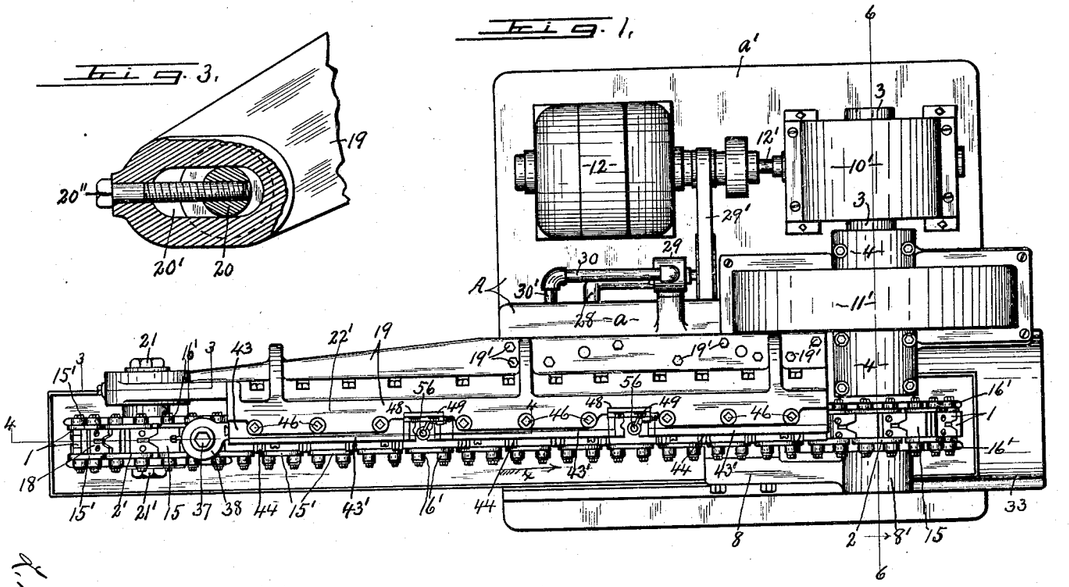
Figure 1 is a top plan of a castellating machine embodying the various features of my invention.
Figure 3 is an enlarged horizontal detail sectional view taken in the plane of line 3—3, Figure 1.
Figure 2:
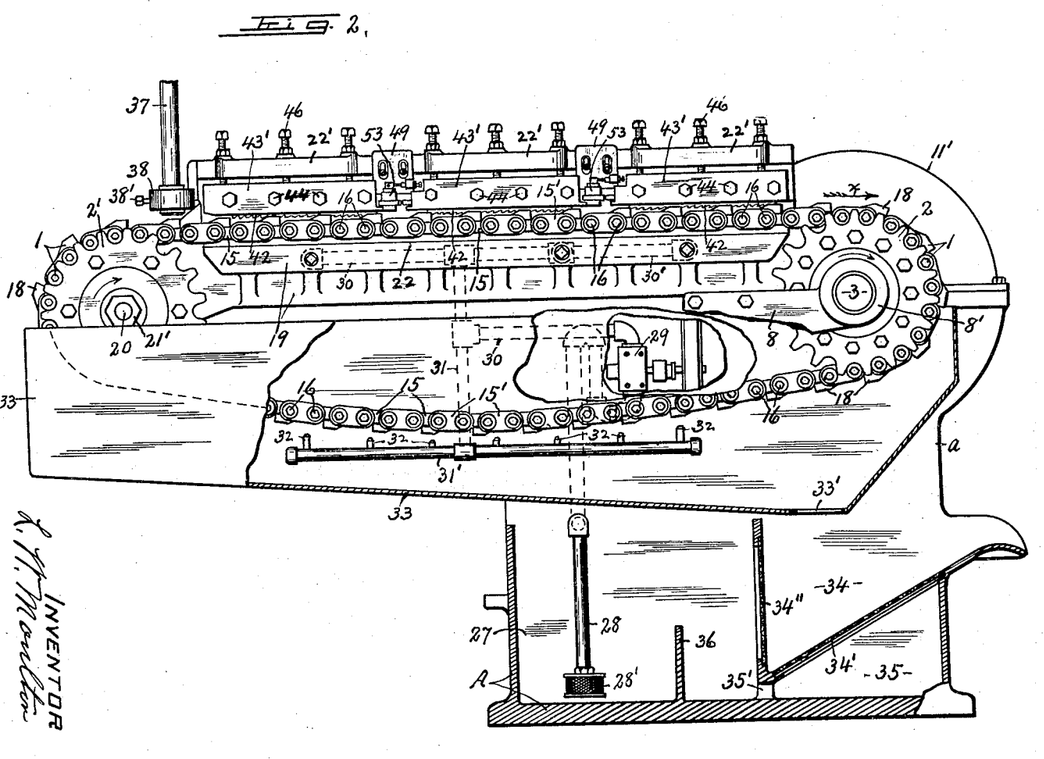
Figure 2 is a side elevation, partly in section, of the same machine.
Figure 6:
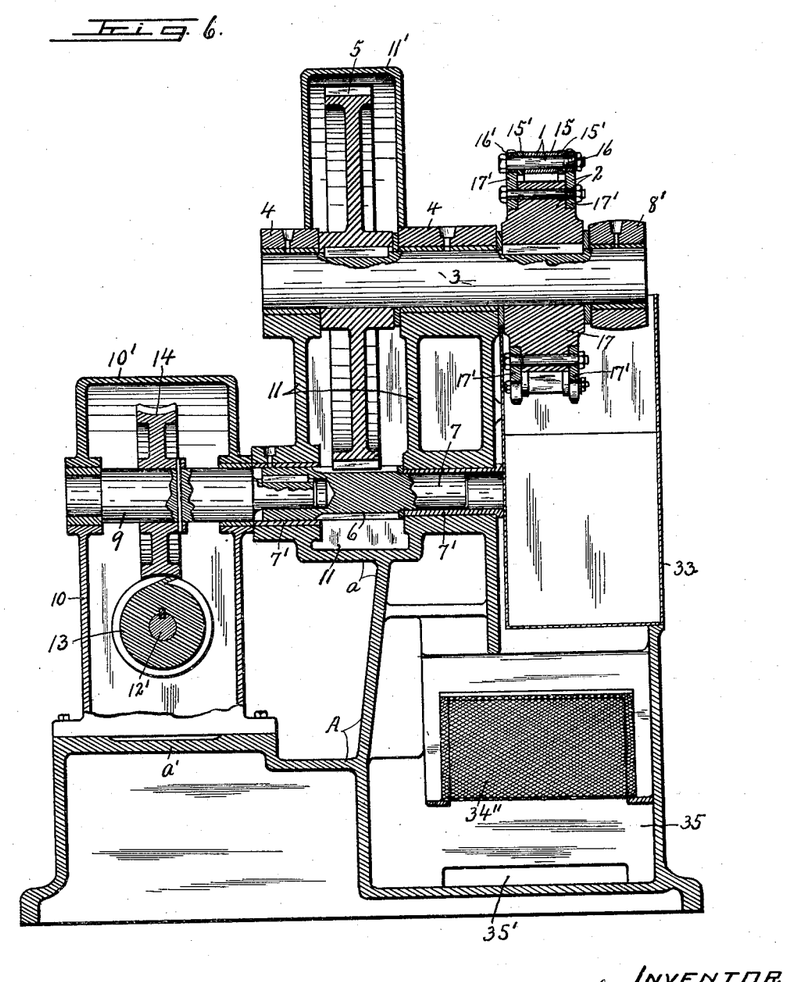
Figure 6 is a transverse vertical sectional view taken in the plane of line 6—6, Figure 1.

The sprocket wheel 2 is secured to the front end of a cross shaft 3 which is journaled in axially spaced bearings 4 on an upright portion —a— of the main supporting frame A and is provided between said bearings with a gear 5 meshing with a pinion 6 on an underlying cross shaft 7, Fig. 6, whereby rotary motion is transmitted from the shaft 7 to the shaft 3 for moving the conveyor belt 1 in the direction indicated by arrow *x*, Figs. 1 and 2.

A bracket 8, Figure 2, is bolted or otherwise removably secured to the front face of the frame A near the sprocket wheel 2 and is provided with a journal bearing 8' in which the front end of the shaft 3 is journaled and also serves to hold the sprocket wheel 2 against forward displacement.

The cross shaft 7 is journaled in suitable bearings 7' in the upright portion —a— of the frame A parallel with an in the same vertical plane as the shaft 3 and has its rear end keyed or otherwise coupled to a rearwardly extending coaxial shaft section 9 which is journaled in the front and rear walls of a gear case 10 and also extends into a socket in the rear end of the shaft 7 as shown in Fig. 6.

The upright portion —a— of the frame A containing the gears 5 and 6 constitutes a gear housing and oil chamber 11 and is provided with a cap section 11' bolted or otherwise removably secured thereto for convenience of access to said chambers for filling purposes.

The base of the frame A is provided with a rearwardly projecting platform —a'— upon which is bolted or otherwise removably secured the gear case 10 and an electric motor 12 which is located at one end of the gear case in spaced relation thereto and has its armature shaft 12' or an extension thereof journaled in the end walls of the gear case and provided with a gear-worm 13 meshing with a worm-gear 14 on the shaft section 9, Fig. 6, for transmitting rotary motion from the motor to the cross shaft 6 but at a reduced rate of speed.

The gears 13 and 14 are located within the case 10 in planes one beneath the other and at right angles to each other, said case being adapted to contain oil for lubricating purposes and provided with a cap section 10' bolted or otherwise removably secured thereto to permit access to the interior thereof.

The electric motor 12 may be connected in any conventional manner to a source of current supply and constitutes the primary source of power for transmitting motion to the conveyor belt 1 and for other purposes hereinafter described.

The conveyor belt 1 is used for feeding the individual pieces of work to be castellated into cutting engagement with the broaching tools and is therefore subjected to more or less severe strains and in order that it may withstand these strains it is made up of a multiplicity of specially constructed links 15 and 15' of strong and durable metal hinged together end to end by pivotal pins 16 of hardened steel or equivalent metal.

Figure 7:
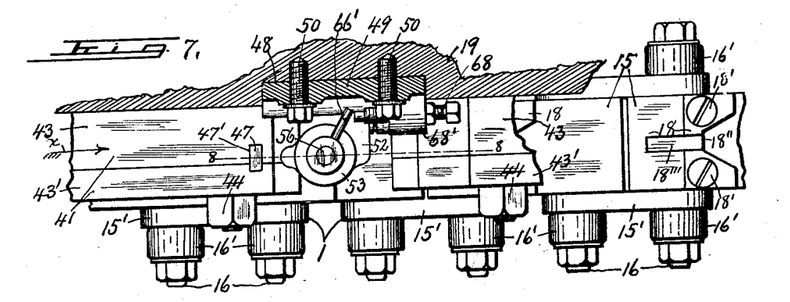
Figure 7 is an enlarged horizontal sectional view taken in the plane of line 7—7, Figure 4.

The links 15' are arranged at opposite sides of and overlap upon the links 15 while the pivotal pins 16 extend beyond the outer faces of the links 15' for receiving and supporting suitable rollers 16' which are held in place by nuts engaging the outer ends of the pivotal pins as shown in Fig. 7.

The sprocket wheels 2 and 2' are similar in construction and each preferably comprises a hub section 17 and a pair of sprocket rings 17' bolted or otherwise secured to the opposite ends of the hub 17 in axially spaced relation, (Fig. 5) corresponding to the transverse spacing of the rollers on each of the pivotal pins 16, the teeth of the sprocket rings being uniformly spaced circumferentially to correspond to the longitudinal spacing of the rollers 16' so that the latter may ride freely into and out of the spaces between the teeth and at the same time establish a positive drive connection between the driving sprocket 2 and chain belt 1.

Figures 8, 9, 10:
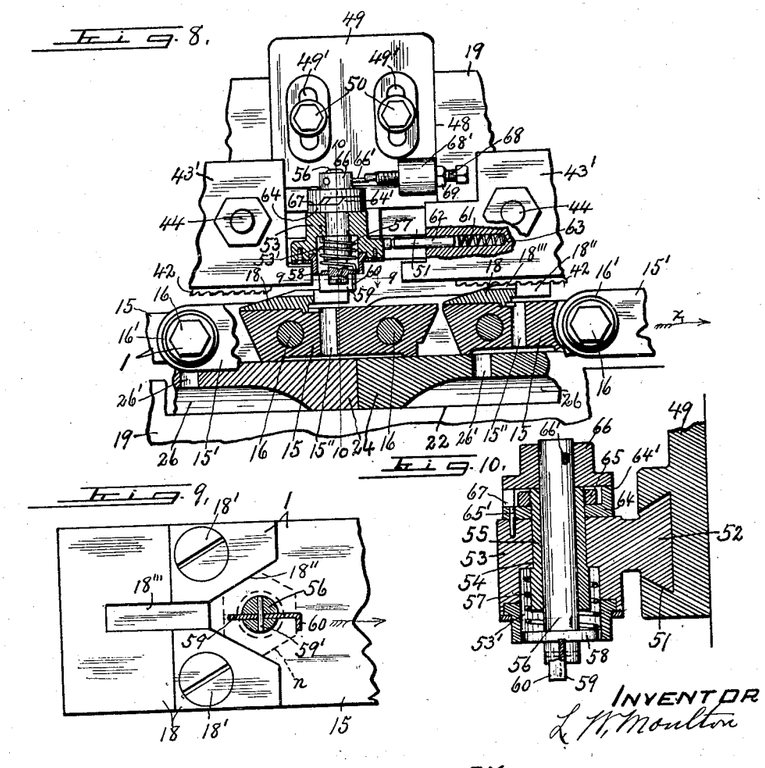
Figure 8 is a detail vertical sectional view taken in the plane of line 8—8, Figure 7.
Figures 9 and 10 are detail horizontal and vertical sectional views taken in the planes of line 9—9, and 10—10, respectively, Figure 8.

Each link 15 is provided on its outer side with a block 18 of hardened steel or equivalent material bolted or otherwise removably secured thereto and formed with a V-shaped recess —18″— having its larger end open and facing the direction of movement of the belt for engaging and feeding the articles to be cut into engagement with the broaching tools for castellating purposes, said links 15 and blocks 18 being formed with inter-engaging end thrust shoulders for taking part of the strain and thus reducing the strain upon the clamping bolts as 18', Figure 9.

The article-feeding blocks 18 are arranged in uniformly spaced relation along and upon the longitudinal center of the link bolt with their recesses in the same direction and made to conform more or less to the shape of the articles to be castellated, each block being provided with a lengthwise groove 18‴ in its outer face in alinement with and adapted to receive the cutting edges of the broaching tools and thereby to allow the tools to make the desired cuts in the work without in any way impairing the blocks, Figures 8 and 9.

Figures 4, 5:
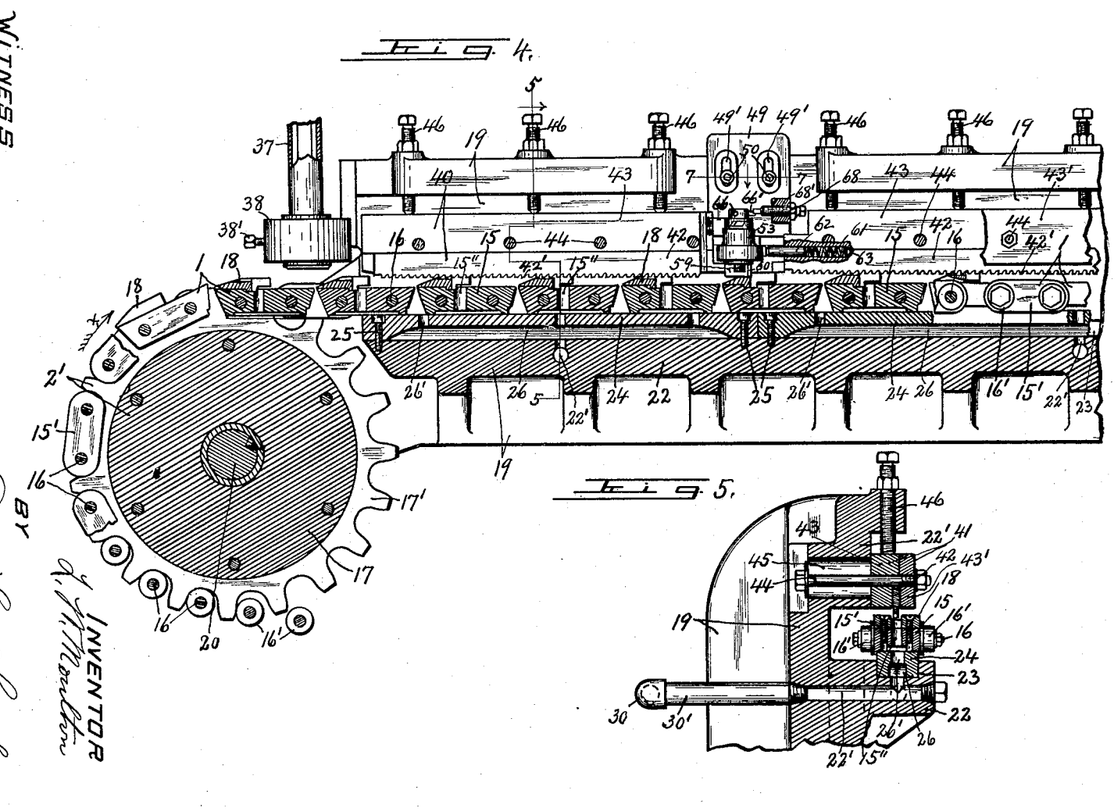
Figure 4 is an enlarged longitudinal vertical sectional view taken in the plane of line 4—4, Figure 1.
Figure 5 is a detail vertical sectional view taken in the plane of line 5—5, Figure 4.

The links 15 are also provided with vertical holes 15″ therethrough for the reception of lubricating oil under pressure which serves to clean the blocks from broaching chips and other matter tending to lodge thereon, Figures 4 and 8.

A horizontal bracket or frame extension 19 is secured by bolts 19', Figure 1, to the upper front portion of the upright —a— of the frame A for supporting the upper side of the conveyor belt 1 in a substantially horizontal plane and also for receiving and supporting a stud shaft 20 upon which the drum 2' is rotatably mounted, the outer end of said bracket being provided with a lengthwise slot 20' to permit adjustment of the stud shaft and drum 2 for properly tensioning the belt, by means of an adjusting screw 20″, Fig. 3.

The rear end of the shaft is provided with a clamping nut 21 engaging the bracket for holding said shaft in its adjusted position while the front end of the shaft is provided with a nut 21' for holding the drum 2' against forward displacement from the shaft, Figures 1 and 2.

The bracket 19 is provided with forwardly projecting lengthwise ledges 22 and 22', arranged in vertically spaced parallel relation in planes below and above the upper horizontal portion of the conveyor belt 1 and extending from a point adjacent the inner side of the drum 2 to a point adjacent the inner side of the drum 2', Figures 2, 4 and 5.

The lower ledge 22 projects forwardly under and beyond the conveyor belt 1 and is provided in its upper side with a lengthwise groove 23, Fig. 5, extending from end to end thereof and in which is seated a plurality of, in this instance three, similar and interchangeable guide bars 24 of hardened steel or equivalent material arranged end to end in the same horizontal plane to extend the entire length of the ledge 22 directly under the upper side of the belt 1 and superposed broaching devices presently described, Figs. 4 and 5.

These guide bars 24 serve as bearings along and upon which the upper side of the belt is adapted to travel during the broaching operation and are removably secured to the ledge 22 by bolts 25, Fig. 4, to permit any one of more of them to be readily replaced when worn or otherwise impaired without disturbing the others, it being understood that the upper surfaces of the bars are smooth and closely joined at the ends in the same horizontal plane to form a practically continuous bearing for the upper side of the conveyor chain.

The guide bars 24 are provided in their under sides with oil chambers 26 within the marginal edges thereof and are also provided with oil passages 26' leading from said chambers through the upper faces of the bars for lubricating said faces and chain links bearing thereon so that the belt may slide along and upon said faces with a minimum frictional resistance.

The portions of the ledge 22 underlying the bars 24 are provided with oil passages 22' leading to the chambers 26 and to which oil is supplied under pressure for directing the oil into said chambers and thence through the passages 26' and 15" to the upper surfaces of the links 15 for cleansing the latter from chips and other matter which may tend to lodge thereon and also supplying oil to the articles to be cut and to the broaching tools to facilitate the cutting of said articles.

*Oil feeding means*

As shown in Figure 2 the base of the frame 1 is provided with an oil containing chamber 27 in which is arranged an upright conduit 28 carrying at its lower end a screen 28' which is immersed in the oil in the chamber 27 and serves as a filter to cleanse the oil from excess foreign matter.

The upper end of the pipe or conduit 28 is connected to the suction side of a pump 29, Figures 1 and 2, having its pressure side connected by pipes 30 and 30' to the passages 22' in the bracket 19, Figure 5, for lubricating purposes as hereinbefore described.

The pump 29 is driven from the motor shaft 12' by means of a belt 29', Figure 1.

The pipe 30 is provided with a downwardly extending branch 31, Figure 2, terminating at its lower end in a distributing head 31' which underlies the lower side of the link belt 1 and is provided with upwardly projecting jets 32 for delivering oil to the under side of the belt and thereby to lubricate the pivotal connections between the links.

A drip pan 33 is mounted on a forwardly projecting portion of the base of the frame A so as to extend the entire length and directly under the lower side of the link belt 1 and sprocket wheels 2 and 2' for receiving any oil which may drip from the distributing pipes or parts to which the oil has been previously distributed by the pump 29, the bottom of the tank being inclined from a point directly under the sprocket wheel 2' to a point directly under the sprocket wheel 2 and is provided at its lowest point with an opening 33' for discharging oil collected therein into an underlying compartment 34 in the base of the frame A at one end of the compartment 27 as shown in Figure 2.

This compartment 34 is provided with an inclined screen bottom 34' and an inner upright screen partition 34" at the lower end of the inclined bottom 34' so that the oil falling upon the inclined bottom 34' will be filtered therethrough into a underlying compartment 35 which communicates with the compartment 27 through an opening 35', Figure 2.

The bottom of the compartment 27 is provided with an upstanding partition 36 between the screen 28' and 34" and rising some distance above the level of the screen 28' to allow the oil which may be filtered through the screen 34" into the compartment 27 to pass over the top of the partition 36 in a substantially pure state for redistribution by the pump 29 to the several distributing pipes previously mentioned, it being understood that the portion of the chamber between the partition 36 and screen 34" will serve to allow sediment and other foreign matter in the oil to precipitate to the bottom of the chamber 27 while the purer oil will flow over the top of said partition and into the compartment containing the screen 28'.

Article depositing means

Any suitable means may be provided for depositing the articles to be castellated upon one end of the upper portion of the belt adjacent the drum 2', said means consisting, in this instance, of an upright tubular magazine 37 having its lower end mounted in a tubular projection 38 on the adjacent end of the bracket 19 for vertical adjustment therein and held in its adjusted position by a set screw 38', Figures 1, 2 and 4, said magazine being disposed in the longitudinal vertical plane of the upper portion of the link belt 1 with its lower end in sufficiently spaced relation thereto to permit the discharge and forward feed of the articles one by one by the blocks 18 on said belt after said blocks are successively presented to the lower end of a magazine.

The entire cross sectional form of the magazine 37 corresponds approximately to that of the articles to be castellated and these articles are stacked one upon the other in the magazine in such manner that the lowermost article will rest upon the upper side of the adjacent portion of the belt in alinement with the V-shaped recess 18'' in the forward ends of the blocks 18.

The magazine support 38 may also be adjustably mounted upon the adjacent end of the bracket 19 to vary the height the distance between the lower end of the magazine and upper side of the belt according to the height of the articles to be operated upon.

It is now clear that as the upper side of a chain belt continues its forward movement in the direction indicated by arrow $x$, Figure 2, the blocks 18 on the links 15 will successively remove the lowermost articles from the lower end of the magazine 37 and send them forwardly one by one into engagement with the broaching tools presently described until the castellated articles are finally discharged from the forward end of the upper side of the belt, the broaching operation being effected without interruption of the movement of the belt.

Broaching mechanism

A series of, in this instance three, broaching devices 40 are mounted upon the front face of the upper ledge 22' of the bracket 19 directly over the upper side of the conveyor belt and in longitudinally spaced relation between the drums 2 and 2' for successively broaching the articles as they are conveyed by the belt from one to the other of the broaching devices, see Figures 4 and 5.

Each broaching device comprises a tool holder 41 and a longitudinally tapered broaching tool 42, each tool holder consisting, in this instance, of a pair of juxtaposed bars 43 and 43' between which the upper edge of the corresponding broaching tool 42 is firmly clamped by means of clamping bolts 44, Figure 5, which also serves to clamp the holder to the front face of the ledge 22.

The clamping bolts 44 are passed through a vertically elongated slot 45 in the bracket 18, Figure 4, to provide for vertical adjustment of the tool holder with the tool therein relatively to the upper side of the conveyor belt for varying the depth of cut into the articles carried forwardly by said belt.

The tool holder 41 is adjusted downwardly by means of a plurality of screws 46 engaged in threaded apertures in the overhanging portion of the ledge 22' as shown in Figures 4 and 5, said screws also serving to retain the tool holders in their adjusted positions against vertical springing movement during the broaching operation, while the clamping bolts 44 serve to additionally retain the tool holders and tool in their adjusted positions.

When the clamping bars 43 and 43' are assembled for the retention of the broaching tool 42 they form a lengthwise groove in the lower side of the holder while the upper edge of the tool is substantially straight and engages the top wall of the groove thereby establishing a firm and unyielding seat for the upper edge of the tool to resist upward displacement thereof during the broaching operation, said groove being formed mainly in the front side of the bar 43 as shown in Figure 5.

Each broaching tool 42 is provided along its lower edge with cutting teeth 42', Figure 4, in which it will be observed that the cutting edge of each tool is disposed in a plane at a slight angle to its upper straight edge and is inclined forwardly and downwardly from end to end for producing a gradually increasing cut in the article as the latter is fed against the teeth by the belt 1.

That is, each tool is slightly tapered from end to end and arranged with its larger end foremost or in the direction of the movement of the articles by the belt so that during the cutting operation the resistance to such operation will be reduced to a minimum thereby relieving the strains on the tool and its holder and also the strains upon the work and its feeding means to a minimum.

Each broaching tool is provided at its forward end with a tang or shoulder —47— projecting upwardly therefrom into a corresponding groove or socket —47'— in the holder —41— to hold it against endwise displacement.

It is now clear that the broaching tools are arranged in longitudinal alinement in the same vertical plane directly over the longitudinal center of the upper side of the conveyor belt —1— but in spaced relation so as to leave an appreciable space between the adjacent ends of the broaching devices in which each individual article, after being operated upon by the first broaching device, may be turned or adjusted angularly about its axis preparatory to broaching the same article along a different line than that produced by the first broaching device.

Article turning means

Suitable devices are arranged in the spaces between the broaching devices for turning the individual articles as they are successively presented to said spaces or as they pass from the first broaching tool to the second broaching tool and from the second to the third broaching tool for cutting said articles along different or intersecting lines, see Figures 4 and 7 to 10 inclusive.

The rear portion of the horizontally extending bracket —19— is provided in its front side with recesses —48— in transverse alinement with the spaces between the adjacent ends of the broaching devices for receiving a corresponding number of vertical brackets —49— as shown more clearly in Figure 7 and 8.

Each bracket —49— is adjustable vertically independently of the others to conform to the vertical adjustment of the broaching tools and for this purpose is provided with vertical slots —49'— for receiving clamping bolts —50— whereby the bracket is firmly clamped in its adjusted position.

Each bracket —49— is provided in its front face with a horizontal dove-tailed groove —51— for receiving a correspondingly dove-tailed portion —52— of a horizontally slidable head —53—.

That is, each head —53— is free to slide endwise in the dovetailed groove —51— on the bracket —49— in a manner and for a purpose hereinafter described and is provided with a vertical opening —54— in which is journaled an upright tube or sleeve —55— carrying a rotary vertical shaft —56— which extends through and some distance beyond the opposite ends of the sleeve —55— and head —53—, see Figure 10.

The head —53— is arranged directly over the longitudinal center of the conveyor belt —1— so that its axis and, therefore, the axis of the vertical shaft —56— will be disposed in a vertical plane intersecting the longitudinal center of the conveyor and in the line of travel of the centers of the articles to be broached as said articles are fed forwardly by their respective blocks —18—, Figures 8 and 9.

The head —53— is provided with a socket —53'— extending upwardly from its lower end for receiving the lower end of the sleeve —55— and a coiled spring —57— which surrounds the lower end of said sleeve and has one end secured to the upper wall of the socket —53'— and its other end secured to a flange —58— on the lower end of the shaft —56— to serve the double purpose of exerting downward pressure upon the shaft and also for returning the shaft rotarily when turned from its normal position in a manner presently described.

An article-turning tool —59— is secured by a pin —59'— in a diametrical slot in the lower end of the shaft —56— to project downwardly therefrom for engaging in the slots in the articles which have been previously broached by the first broaching tool of the series so that when the previously broached articles are successively registered with the tool —59—, turning of the shaft —56— in a manner presently described will effect a corresponding turning movement of the article engaged by said tool.

The turning tool —59— is provided at its forward end with a laterally projecting shoulder —60— which normally lies in the path of the upper portion of the forwardly moving article as the latter is fed forwardly by the block —18— on the conveyor belt.

This forward feeding of the article as, for example, a hexagonal nut —n—, Figure 9, against the shoulder —60— causes a limited forward movement of the slide block —52— along the ways —51— and against the action of a retracting spring —61—, Figure 8, through the medium of a plunger —62—, said coiled spring —61— and plunger —62— being guided in a socket —63— in the end of the broaching holder 40— at the right hand side of the head —53—, Figures 4 and 8.

A stationary cam ring —64— is mounted upon the upper end of the head —53— to surround the adjacent portion of the sleeve —55— and is held against rotation by a dowel pin —65—, Figure 10, said cam ring having a cam face —64'— on its upper end.

The cam ring —64— is held against upward displacement by a nut —65— which engages the threaded upper end of the sleeve —55— and upper face of the cam ring, as shown in Figure 10.

A cam collar —66— is secured by a pin —66'— or equivalent fastening means to the upper end of the shaft —56— to normally rest upon the upper end of the sleeve —55— and is provided on its lower side with a cam face —67— cooperating with a cam face —64'— for raising the shaft —56— against the action of the spring —57— as the shaft is turned from its normal position in a maner presently described.

The key or pin —66'— extends radially some distance beyond the hub of the collar —66— and across one end of a stop screw —68— which is engaged in a threaded apertured lug —68'— on the bracket —49—, Figures 7 and 8, and is held in its adjusted position by a lock nut —69—.

This top screw —68— is arranged lengthwise of the machine just at the rear and at the right hand of the head —53— so that as the head is moved forwardly in the direction of movement of the conveyor by the engagement of the previously broached article with the shoulder —60— on the turning tool —59— against the action of the spring —61— the engagement of the free end of the pin —66'— with the adjacent end of the stop screw —68— will cause the shaft —56— and article engaged by the tool —59— to be turned a definite angle, in this instance thirty degrees as the article is fed forwardly by the conveyor without interrupting the movement of said conveyor.

This turning movement of the shaft —56— causes a corresponding turning movement of the cam collar —66— which rides upon the cam surface of the ring —64— thereby forcing the shaft —56— upwardly against the action of the spring —57— and simultaneously withdrawing the tool —59— from engagement in the previously broached slot in the article formerly engaged by said tool, it being understood that the article, such as the nut —n— operated upon may be turned against the forwardly diverging walls of the V-shaped slot —18''— in the adjacent block —18— without material resistance by reason of the slight difference between the longer and shorter radii of the flat sides of the nuts and the clearance between the inner end wall of the slot —18''— and adjacent side of the nut.

The arc of movement of the shaft —56— and its article-turning tool —59— is regulated by the radial length of the pin —66'— and the position of the adjacent end of the stop screw —68—, both of which parts are adjusted in this instance to cause the shaft —56— and its article turning tool —59— to move through an arc of thirty degrees to effect a corresponding turning movement of the article —n— at about the same time that the tool —59— is withdrawn from engagement with the article, the cam surfaces —64'— and —67— being adjusted to effect the withdrawal of the tool —59— from the work at about the same time that the pin —66'— reaches the end of its angular movement when it is disengaged from the adjacent end of the stop screw —68—.

Immediately upon the release of the pin —66'— from engagement with the stop screw —68— and resultant withdrawal of the tool —59— from engagement with the work —n— the shaft —56— and tool —59—together with the cam collar —66— are returned to their normal positions by the spring —57— while at the same time the sliding block —52— carrying the shaft —56— will also be returned to its starting positions by the spring —61— ready for a repetition of the operation upon the next succeeding article.

It is understood that the article feeding blocks —18— are spaced longitudinally a sufficient distance apart to permit this turning movement of each article and return of the operating parts to their normal positions before the next succeeding article is presented to the turning device.

In like manner after the articles are broached by the second broaching device and are successively registered with the space between the second and third broaching devices they are again turned in the same direction and at a corresponding angle by a similar turning device preparatory to cutting by the third broaching device thus completing the operation for a nut or similar piece of work of hexagonal form, the cuts by the broaching dies being made diametrically of the article by each broaching tool, but the articles are fed continuously along and upon the upper side of the belt.

Operation

Assuming that the articles to be broached are stacked one upon the other within the magazine —37— so that the lowermost article rests upon the upper side of the conveyor belt —1— and that the conveyor belt is being operated by the motor —12— in the direction indicated by the arrows.

Then, as the open sides of the blocks 18 successively approach the lower end of the magazine —37— they will engage and feed forwardly the lowermost article against the first broaching tool of the series thereby cutting a diametrical slot in the upper surface of the article at which time the turning tool 59 of the first turning device of the series will be in alinement with the previously formed slot in the article so that the adjacent article will be fed directly under the lower end of the shaft 56 with the turning tool 59 in engagement with the slot of said article.

Now, as the article —n— continues its forward feed it will engage the shoulder —60— of the turning tool thereby moving the turning device to the right against the action of the spring —61—.

This forward feeding of the turning device causes the pin —66'— to engage the adjacent end of the relatively stationary stop screw —68— which, in turn, effects a turning movement of the shaft —56— and a corresponding turning movement of the nut —n— through an arc of, in this instance thirty degrees, against the action of the spring 59.

Simultaneously with this turning movement the rotation of the cam —66— upon the cam —64— will effect a vertical movement of the shaft 56 sufficient to withdraw the turning tool 59 out of engagement with the article —n— thus permitting the turned article to continue its forward feed by the movement of the conveyor —1— while at the same time the sliding block 52 and turning device carried thereby will be resorted to its starting position by the spring 61 and the shaft 56 will instantly be returned to its starting position by the spring 57, the turning device being then in position for repeating the turning operation of the next succeeding article.

The continued forward feeding of the turned article —n— brings it into broaching engagement with the second broaching tool 42 where the broaching operation is repeated along a different line on the article until said article reaches the next turning device where the turning operation is repeated to cause the article to be broached along a third line by the third broaching tool.

This broaching of the article by the third tool completes the operation for a hexagonal article but it is evident that the number of broaching tools and consequently the number of turning devices may be continued indefinitely or may be reduced to two broaching devices with one intervening turning device, if desired, without departing from the spirit of this invention.

What I claim is:

1. In a castellating machine, an endless conveyor belt, rotary supporting drums therefor, means for rotating one of the drums for driving the belt continuously in one direction, article-engaging blocks mounted on the belt in longitudinally spaced relation and provided with V-shaped recesses with open ends facing in the direction of movement of the belt, means for depositing the articles to be castellated into the path of movement of the open ends of the recesses, broaching devices arranged in spaced relation lengthwise of the belt and having broaching tools in the path of movement of portions of the articles for broaching the same as they are fed against the broaching tools, and means actuated by the movement of said articles as they pass the spaces between the broaching devices for turning said articles relatively to the conveyor belt to cause the second broaching device to broach the articles along different lines than the first broaching device.

2. In a machine for castellating nuts and other articles, broaching devices sequentially arranged in spaced relation, means for feeding the articles successively and continuously in sequence into cutting engagement with the broaching devices, and means including a rock shaft actuated in one direction by said articles for turning the same while in transit across the spaces between the broaching devices, and means for returning the rock shaft in the opposite direction after each returning operation of the article.

3. In a castellating machine, an endless conveyor upon which the articles to be broached are sequentially placed, means for moving the conveyor with the articles thereon continually in one direction, a plurality of broaching tools supported in rectilinearly spaced relation along the conveyor in the path of movement of portions of said articles for broaching the same as they are carried forwardly by said conveyor, means including a reciprocally movable head actuated in one direction by said articles for turning said articles as they reach a certain point in their travel, and means for returning said head to its starting position, said conveyor being provided with longitudinally spaced abutments having recesses with open ends facing in the direction of movement for receiving the articles to be broached.

In witness whereof I have hereunto set my hand.

LLOYD W. MOULTON.